(12) United States Patent
Zhang et al.

(10) Patent No.: US 7,966,880 B2
(45) Date of Patent: Jun. 28, 2011

(54) ADJUSTING THE DAMPING LEVEL OF AN ENCAPSULATED DEVICE

(75) Inventors: Wenhua Zhang, Sunnyvale, CA (US); Robert G. Walmsley, Palo Alto, CA (US); Peter George Hartwell, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 292 days.

(21) Appl. No.: 12/250,089

(22) Filed: Oct. 13, 2008

(65) Prior Publication Data

US 2010/0089153 A1    Apr. 15, 2010

(51) Int. Cl.
    *G01P 1/02*    (2006.01)
(52) U.S. Cl. .......................................... 73/431
(58) Field of Classification Search ............. 73/431; 267/136
    See application file for complete search history.

(56) References Cited

U.S. PATENT DOCUMENTS

2003/0218283 A1* 11/2003 Yasumura et al. ............ 267/136

* cited by examiner

*Primary Examiner* — Hezron Williams
*Assistant Examiner* — Tamiko D Bellamy

(57) ABSTRACT

Encapsulated devices that can adjust the damping level within are provided. In this regard, a representative encapsulated device, among others, comprises a bottom substrate, a middle substrate that is disposed above the bottom substrate, and a top substrate that is disposed above the middle substrate. The middle substrate comprises an outermost structure and at least one damping device. The at least one damping device is supported to the outermost structure. At least one top gap and a bottom gap are formed between the at least one damping device and the top and bottom substrates, respectively. The at least one top gap has at least one cavity depth that is adapted to adjust the damping level of the encapsulated device.

20 Claims, 4 Drawing Sheets

ADJUSTING THE DAMPING LEVEL OF AN ENCAPSULATED DEVICE

TECHNICAL FIELD

The present disclosure relates to encapsulated devices, e.g., accelerometer and gyroscopes, and more particularly, the disclosure relates to damping controls of the encapsulated devices.

BACKGROUND

Many devices, such as gyroscopes and accelerometer, have moving masses that move tangentially along a surface, resulting in the dissipation of energy that can be referred to as viscous damping. A traditional method to control the viscous damping is to adjust packaging pressure, since viscous damping is pressure dependent. Using this traditional method, devices are typically encapsulated in different chambers to integrate two or more devices with different damping requirements. In addition, vacuum leak between the chambers can be a long-term performance problem. Further, multiple vacuum packaging is complicated and expensive, e.g., more area is needed. Thus, the above-mentioned difficulties related to the traditional method of controlling the viscous damping can be improved.

SUMMARY

Encapsulated devices that can adjust the damping level within are provided. In this regard, a representative encapsulated device, among others, comprises a bottom substrate, a middle substrate that is disposed above the bottom substrate, and a top substrate that is disposed above the middle substrate. The middle substrate comprises an outermost structure and at least one damping device. The at least one damping device is supported to the outermost structure. At least one top gap and a bottom gap are formed between the at least one damping device and the top and bottom substrates, respectively. The at least one top gap has at least one cavity depth that is adapted to adjust the damping level of the encapsulated device.

The present invention can also be viewed as providing methods for adjusting damping level of an encapsulated device. In this regard, one embodiment of such a method, among others, can be broadly summarized by the following steps: providing a top substrate, middle substrate and bottom substrate, the middle substrate being disposed above the bottom substrate, the middle substrate comprising an outermost structure and at least one damping device, the at least one damping device being supported to the outermost structure, the top substrate being disposed above the middle substrate, at least one top gap and a bottom gap being formed between the at least one damping device and the top and bottom substrates, respectively, the least one top gap having at least one cavity depth; and adjusting the at least one cavity depth to adjust the damping level of the encapsulated device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which the damping level of an encapsulated device can be adjusted.

Figure 1:
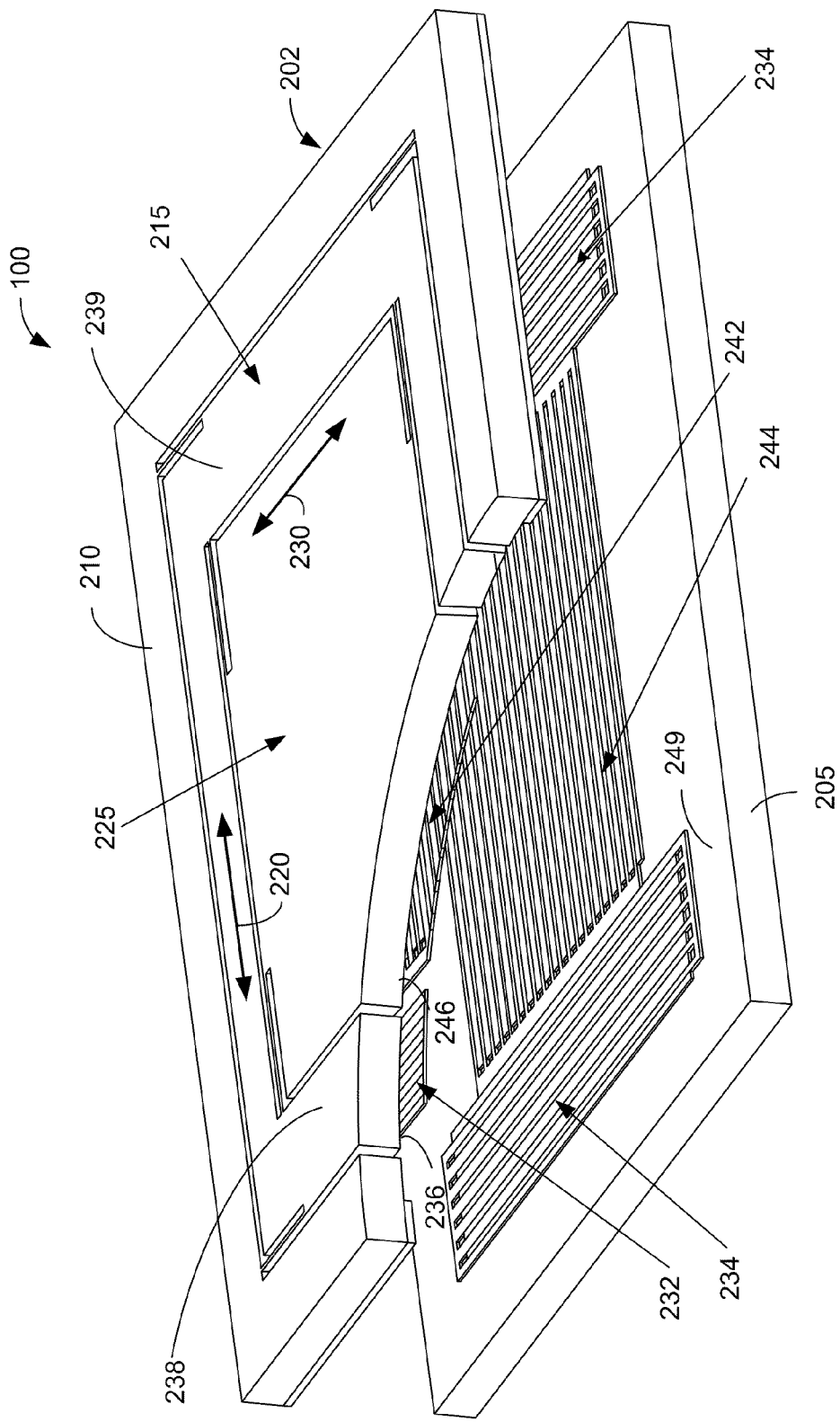
FIG. 1 is a schematic drawing of an embodiment of an encapsulated device having damping control.

FIG. 1 is a schematic drawing of an embodiment of an encapsulated device 100 having damping control. The encapsulated device 100 in this disclosure is a microelectromechanical systems (MEMS) gyroscope where surface electrode technology is used. However, other devices, such as accelerometers, pressure sensors, and other similar sensors, can benefit from the disclosed damping control.

Figure 2:
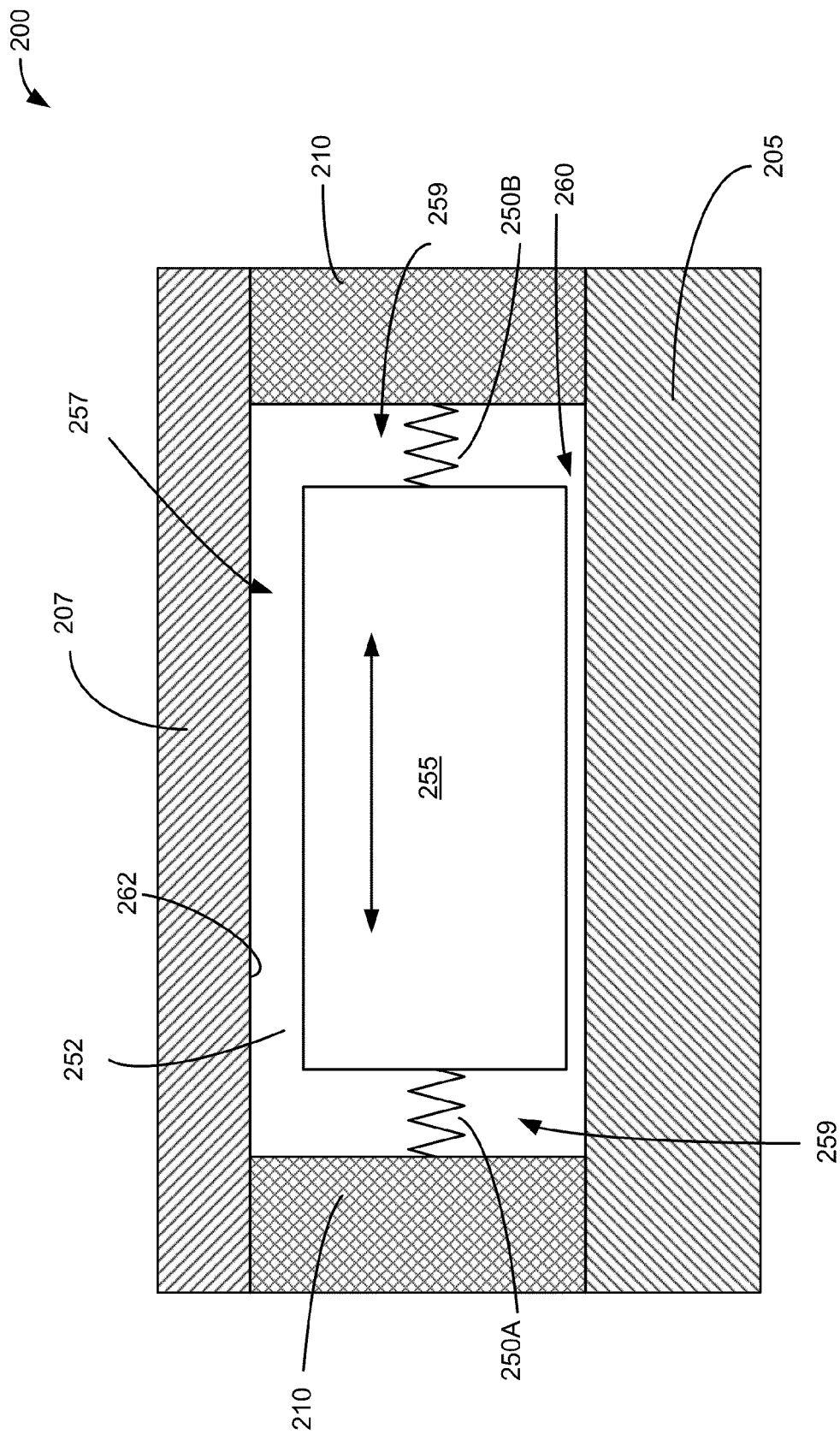
FIG. 2 is a cross-sectional view of an embodiment of an encapsulated device, such as that shown in FIG. 1, that can adjust damping level.

The encapsulated device 100 includes a middle substrate 202 and a bottom substrate 205. The middle substrate 202 comprises an outermost structure 210, one or more sensing structures 215, and one or more driving structures 225. In this example, the outermost structure 210 and the sensing structure 215 are open and enclosed similar to that of a window frame. The outermost structure 210 is generally fixed and does not move. The sensing structure 215 and the driving structure 225 are disposed within and supported to the outermost structure 210 and the sensing structure 215 using microbeams 250A-B (FIG. 2), respectively. It should be noted that a top substrate 207 is shown in FIG. 2. The top substrate 207, middle substrate 202, and bottom substrate 205 form an enclosed chamber 352, such as that shown in FIG. 2.

Referring again to FIG. 1, the sensing structure 215 includes first sensing electrodes 232 that are disposed on a bottom surface 236 of the sensing structure 215 and aligned parallel to at least one side wall 238, 239 of the sensing structure 215. In this example, the first sensing electrodes 232 are disposed at the left and right side walls 238, 239 of the sensing structure 215. The driving structure 225 includes first driving electrodes 242 that are disposed on a bottom surface 246 of the driving structure 225. The first driving electrodes 242 are disposed adjacent and perpendicular to the first sensing electrodes 232.

The bottom substrate 205 is disposed below the middle substrate 202 and includes second sensing electrodes 234 and second driving electrodes 244 that are disposed on a top surface 249 of the bottom substrate 205 and below the first sensing electrodes 232 and the first driving electrodes 242. The first and second sensing electrodes 232, 234 and the first and second driving electrodes 242, 244 provide a capacitance signal based on the movement of the sensing structure 215 and the driving structure 225, respectively. The capacitance signal is generated based on the sensing structure 215 and driving structure 225 moving perpendicular to the second sensing electrodes 234 and second driving electrodes 244 in the horizontal direction 220 and vertical direction 230, respectively.

Electrostatic force from substrates 202, 205 can be used to move the electrodes 232, 234, 242, 244 on the opposite of and attached to the substrates 202, 205, respectively, while capacitance that changes between the electrodes 232, 234, 242, 244 during motion provides capacitance signal to detect the motion. On each of substrates 202, 205, the electrodes 232, 234, 242, 244 may form several groups depending on specific applications, so that a voltage pattern can be applied to the electrodes 232, 234, 242, 244 and the pattern can alternate periodically in the moving direction.

The sensing electrodes 232 between the driving structure 225 and the outermost structure 210 provide electrostatic force to move the driving structure 225 when certain voltage pattern is applied. The sensing electrodes 234 between the sensing structure 215 and the bottom substrate 205 provide capacitance signal when the sensing structure 215 is moving. As the driving structure 225 moves at a certain velocity back and forth, a Coriolis force generally appears when the whole gyroscope 200 rotates. The Coriolis force moves the sensing structure 215 since the driving structure 225 is coupled to the sensing structure 215. By capacitively detecting the sensing structure movement using the sensing electrodes 230, the rotational signal can be detected.

The sensing structure 215 and driving structure 225 are generally a mass-damping-spring system. The dynamic mode of the sensing structure 215 and driving structure 225 can be translational or rotational, which depends on the operational principles. The driving and sensing mechanism may use two-phase, three-phase or some other driving mechanism. The driving structure 225 generally moves to a certain velocity at a certain frequency. The sensing structure 215 generally detects the signal of the movement of the sensing structure 215. Alternatively or additionally, the sensing structure 215 and the driving structure 225 of the gyroscope 100 can be a single sensing structure 215 and a single driving structure 225 or a combination of identical or different sensing structures 215 and a combination of identical or different driving structures 225. In case of multiple sensing structures 215 and the driving structures 225, they can be independent, or coupled. The coupling mechanism may implement electrostatic/mechanical methods.

Figure 3:
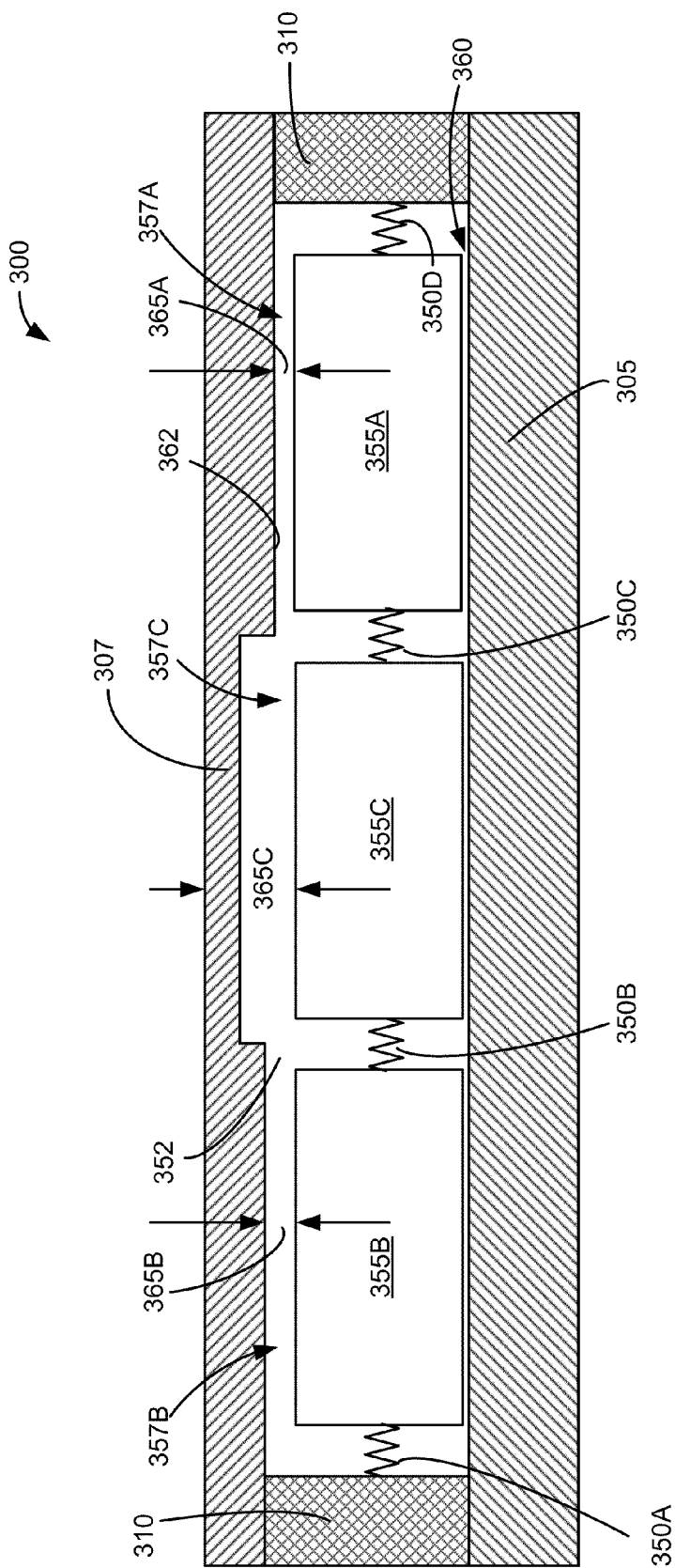
FIG. 3 is a cross-sectional view of another embodiment of an encapsulated device, such as that shown in FIG. 1, that can adjust damping level.
Figure 4:
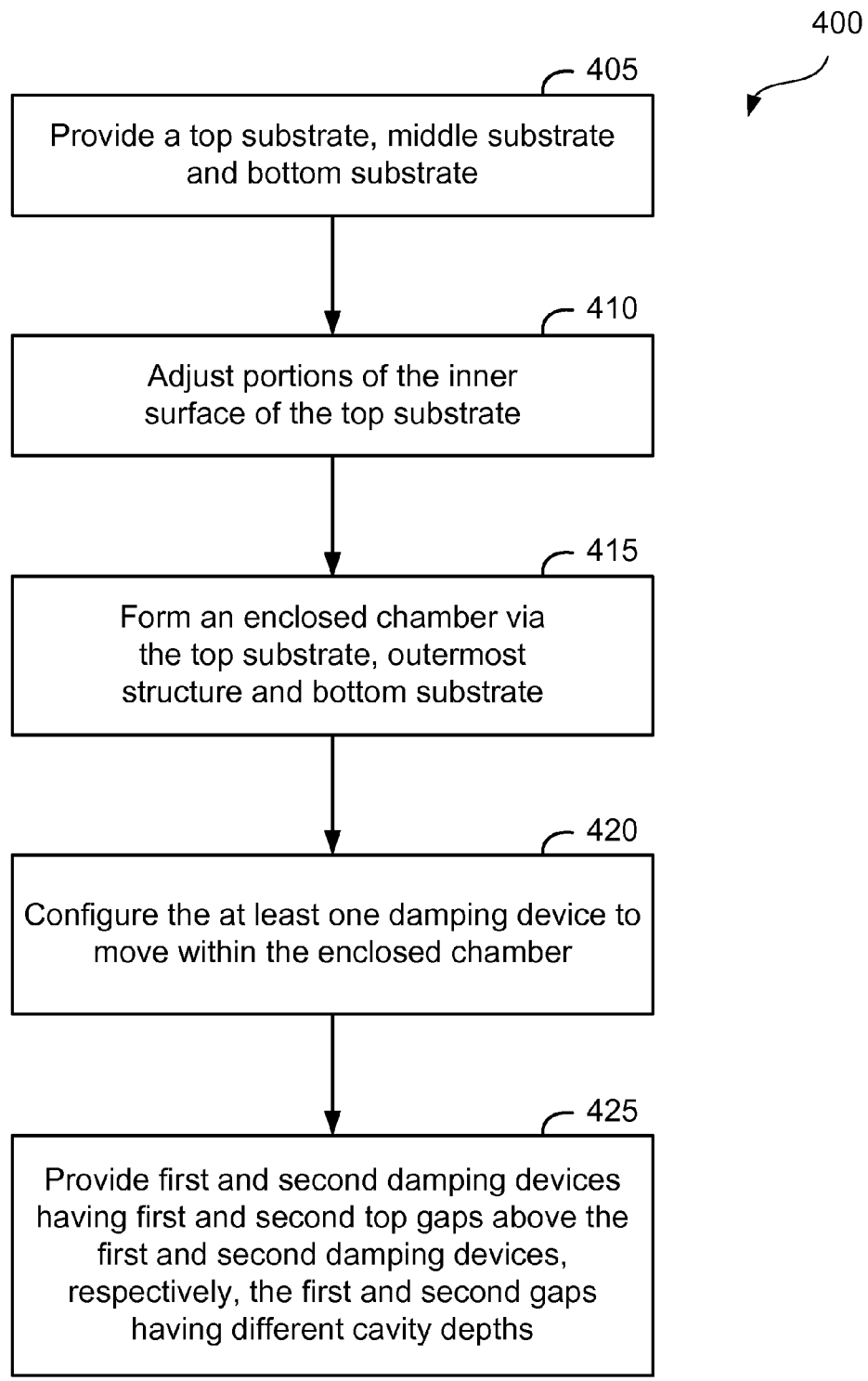
FIG. 4 is a flow diagram that illustrates an embodiment of a method for adjusting the damping level in an encapsulated device, such as that shown in FIG. 1.

The damping level of the encapsulated device 100 can be adjusted by varying the cavity depth (FIG. 3), which is described further in relation to FIGS. 2-4. The method of adjusting damping level allows regulation of viscous damping of multiple devices in the same chamber by varying cavity depth on top or bottom of a moving mass 255 (FIG. 2) or each damping device 355 (FIG. 3).

FIG. 2 is a cross-sectional view of an embodiment of an encapsulated device, such as that shown in FIG. 1, and is denoted generally with reference numeral 200. The encapsulated device 200 includes an enclosed chamber 252 that is enclosed with top substrate 207, outermost structure 210, and bottom substrate 205. The encapsulated device 200 includes a moving mass 255 that is supported to the outermost structure 210 using microbeams 250A-B. The moving mass 255 can include the sensing structure 215 and/or the driving structure 225 (FIG. 1). The moving mass 255 can move laterally parallel to the top or bottom substrates 207, 205.

The enclosed chamber 252 includes viscous damping that can be described using slide film damping theory, e.g., the damping coefficient is proportional to viscosity of the air between the moving mass 255 and the fixed substrates 205, 207, 210 and the area of the enclosed chamber 252, and inversely proportional to top and bottom gaps 257, 260. According to this theory, the moving mass 255 sandwiched between two parallel substrates 205, 207 (one on top and the other on the bottom) with different gap sizes 257, 260. In this example, the top gap 257 is much larger than the bottom gap 260. The viscous damping is generally governed by the smaller gap, which is the bottom gap 260 in this case because the damping force from the larger top gap 257 is much smaller than the smaller bottom gap 260, and thus can be neglected according to the slide film damping theory.

However, in an enclosed chamber 252, the slide film damping theory mentioned above is not entirely accurate. In fact, the viscous damping is found to not only depend on the smaller bottom gap 260, but strongly on larger top gap 257 as well. One potential reason is that the air pressure built-up in side-trenches 259 as the device moves, resulting in a contribution to the total viscous damping, especially for a device with large dimension in the moving direction. The method of adjusting the damping level in the enclosed chamber 252 is described in relation to FIG. 3, particularly by increasing or decreasing the cavity depths of the larger gap 257. In general, the cavity depth can be adapted by adjusting at least one portion of the inner surface 262 of the top or bottom substrate 207, 205 and/or adjusting the height of the outermost structure 210 of the middle substrate 202.

FIG. 3 is a cross-sectional view of another embodiment of an encapsulated device, such as that shown in FIG. 1, and is denoted generally with reference number 300. In general, the encapsulated device 300 can adjust damping level at the larger gap in an enclosed chamber 352. In this example, the larger gap is the top gap 357A-C. It should be noted that the larger gap could be the bottom gap 360 and the smaller gap is the top gap 357 depending on the situation. The encapsulated device 300 includes high damping device 355A, medium damping device 355B, and low damping device 355C. The high damping device 355A and the medium damping device 355B are supported to an outermost structure 310 using microbeams 350A, D and the low damping device 355C is supported to and positioned between the high damping device 355A and the medium damping device 355B using microbeams 350B, C.

The viscous damping level can be adjusted in the encapsulated device 300 by changing the cavity depth of the larger gap, without modifying the small gap, which is usually critical for moving the device or sensing the device motion. In this example, the viscous damping level can be adjusted at the larger top gap 357 without modifying the smaller bottom gap 360. In particular, at least one portion of the inner surface 362 of the top substrate 307 can be adjusted or modified such that the gaps 357A-C between the high, medium and low damping devices 355A-C and the respective portions of the inner surface 362 have varying cavity depths 365A-C, respectively. Alternatively or additionally, the cavity depths 365A-C can be modified by adjusting the height of the outermost structure 310.

The portions of the inner surface 362 of the top substrate 307 above the high, medium, and low damping devices 355A-C are added or remove such that the gap 357A are smaller than the gap 357B, which is smaller than gap 357C. It should be noted that the gaps 357A-C are larger than the bottom gap 360. The high, medium, and low damping devices 355A-C have high, medium, and low damping levels due to the small, medium, and large cavity depths 365A-C of the top gaps 357A-C that were adjusted above the high, medium and low damping devices 355A-C, respectively.

This method of adjusting the cavity depths of the larger top gaps makes it also possible to manipulate damping of multiple devices 355A-C in the same encapsulated chamber 352 in the device design 300, or even control the damping level of the different parts of the device, e.g., gyroscope, or accelerometer and gyroscope in the same package chamber, or xy and z accelerometer in the same package chamber, or other combinations. It should be noted that the viscous damping can be controlled and/or adjusted without changing the pressure inside the enclosed chamber 352.

FIG. 4 is a flow diagram that illustrates an embodiment of a method 400 for adjusting the damping level in an encapsulated device 100, 200, 300. Beginning with step 405, the method 400 includes the step of providing a top substrate 307, middle substrate 202 and bottom substrate 305. The middle substrate 202 is disposed above the bottom substrate 305 and the top substrate 307 is disposed above the middle substrate 202. The middle substrate 202 comprises an outermost structure 310 and at least one damping device 355, which is supported to the outermost structure 310. At least one top gap 357 and a bottom gap 360 are formed between the at least one damping device 355 and the top and bottom substrates 307, 305, respectively.

In step 410, the method 400 further includes the step of adjusting the at least one cavity depth to adjust the damping level of the encapsulated device. The step of adjusting the at least one cavity depth can be achieved by adjusting at least one portion of the inner surface 362 of the top substrate 307 or by adjusting the height of the outermost structure 310 of the middle substrate 202.

In steps 415 and 420, an enclosed chamber 352 is formed via the top substrate 307, outermost structure 310 and bottom substrate 305, and the at least one damping device 355 is configured to move within the enclosed chamber 352. In step 425, the method 400 further includes the steps of providing first and second damping devices 355A, B having first and second top gaps 357A, B above the first and second damping device 355A, B.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. An encapsulated device comprising:
a bottom substrate having a top surface;
a middle substrate that is disposed above the top surface of the bottom substrate, the middle substrate comprising an outermost structure and at least one damping device, the at least one damping device being movably supported to the outermost structure by one or more microbeams;
a top substrate that is disposed above the middle substrate, at least one top gap and a bottom gap being formed between the at least one damping device and the top and bottom substrates, respectively, the at least one top gap having at least one cavity depth that is adapted to adjust the damping level of the encapsulated device;
a first electrode disposed on a surface of the damping device adjacent to and above the top surface of the bottom substrate; and
a second electrode disposed on the top surface of the bottom substrate below and aligned with the first electrode.

2. The encapsulated device as defined in claim 1, wherein at least one cavity depth is adapted by adjusting at least one portion of the inner surface of the top substrate.

3. The encapsulated device as defined in claim 1, wherein at least one cavity depth is adapted by adjusting the height of the outermost structure of the middle substrate.

4. The encapsulated device as defined in claim 1, wherein the at least one top gap between the at least one damping device and the top substrate is larger than the bottom gap between the at least one damping device and the bottom substrate.

5. The encapsulated device as defined in claim 1, wherein the at least one damping device includes first and second damping devices and the at least one top gap includes first and second top gaps that are disposed above the first and second damping devices, the first and second gaps having different cavity depths.

6. The encapsulated device as defined in claim 1, wherein the encapsulated device includes at least one of a gyroscope, an accelerometer, and a combination of a gyroscope and an accelerometer.

7. The encapsulated device as defined in claim 1, wherein the top substrate, outermost structure and bottom substrate forms an enclosed chamber and the at least one damping device is configured to move within the enclosed chamber.

8. A method for adjusting damping level of an encapsulated device comprising:
providing a top substrate, a middle substrate and a bottom substrate, the middle substrate being disposed above the bottom substrate, the middle substrate comprising an outermost structure and at least one damping device, the at least one damping device being movably supported to the outermost structure by microbeams, the outermost structure being immovably supported to one or both of the top substrate and the bottom substrate, the top substrate being disposed above the middle substrate, at least one top gap and a bottom gap being formed between the at least one damping device and the top and bottom substrates, respectively, the at least one top gap having at least one cavity depth;
providing a first electrode and a second electrode, the first electrode being disposed on a bottom surface of the at least one damping device, the second electrode being disposed on a top surface of the bottom substrate adjacent to and aligned with the first electrode; and
adjusting the at least one cavity depth to adjust the damping level of the encapsulated device.

9. The method as defined in claim 8, wherein adjusting the at least one cavity depth is achieved by adjusting at least one portion of the inner surface of the top substrate.

10. The method as defined in claim 8, wherein adjusting the at least one cavity depth is achieved by adjusting the height of the outermost structure of the middle substrate.

11. The method as defined in claim 8, further comprising providing first and second damping devices having first and second top gaps above the first and second damping devices, respectively, the first and second gaps having different cavity depths.

12. An encapsulated device comprising:
a bottom substrate;
a middle substrate that is disposed above the bottom substrate, the middle substrate comprising an outermost structure, first damping device and second damping device, the first and second damping devices being supported to the outermost structure; and a top substrate that is disposed above the middle substrate, first and second top gaps being formed between the first and second damping devices and the top substrate, a bottom gap being formed between the first and second damping devices and the bottom substrate, the first and second top gaps having first and second cavity depths that are adapted to adjust the damping level of the encapsulated device, the first and second cavity depths being different from each other.

13. The encapsulated device as defined in claim 12, wherein the first and second cavity depths are adapted by adjusting at least one portion of the inner surface of the top substrate.

14. The encapsulated device as defined in claim 12, wherein the first and second cavity depths are adapted by adjusting the height of the outermost structure of the middle substrate.

15. The encapsulated device as defined in claim 12, wherein the first and second top gaps have larger cavity depths than the bottom gap.

16. The encapsulated device as defined in claim 12, wherein the encapsulated device includes at least one of a gyroscope, an accelerometer, and a combination of a gyroscope and an accelerometer.

17. The method as defined in claim 8, further comprising:
   detecting a relative motion between the damping device and the bottom substrate by a change in a capacitive coupling between the first electrode and the second electrode.

18. The method as defined in claim 8, wherein the middle substrate further comprises another damping device that is movably supported to the at least one damping device by microbeams, the top substrate being disposed above the other damping device, another top gap and another bottom gap being formed between the other damping device and the top and bottom substrates, respectively, one or both of the other top gap and the other bottom gap being different from the at least one top gap and the bottom gap between the at least one damping device and the top and bottom substrates, the method further comprising:
   providing a third electrode and a fourth electrode, the third electrode being disposed on a bottom surface of the other damping device, the fourth electrode being disposed on the top surface of the bottom substrate adjacent to and aligned with the third electrode, the third and fourth electrodes being oriented substantially perpendicular to the first and second electrodes; and
   adjusting one or both of the other top gap and the other bottom gap to adjust a damping level of the other damping device.

19. The encapsulated device of claim 12, further comprising:
   a first electrode disposed on a surface of one of the first and second damping devices adjacent to and above a top surface of the bottom substrate; and
   a second electrode disposed on the top surface of the bottom substrate below and aligned with the first electrode.

20. The encapsulated device of claim 12, further comprising:
   a first sensing electrode on a bottom surface of the first damping device;
   a first driving electrode disposed on a bottom surface of the second damping device;
   a second sensing electrode disposed on a top surface of the bottom substrate below and aligned with the first sensing electrode; and
   a second driving electrode disposed on the top surface of the bottom substrate below and aligned with the first driving electrode, the first and second sensing electrodes being oriented substantially perpendicular to the first and second driving electrodes.

* * * * *